United States Patent
Li et al.

(10) Patent No.: US 10,240,039 B2
(45) Date of Patent: Mar. 26, 2019

(54) REINFORCED POLYCARBONATE COMPOSITIONS

(71) Applicant: SABIC Global Technologies B.V., Bergen op Zoom (NL)

(72) Inventors: Ying Li, Shanghai (CN); Huanbing Wang, Shanghai (CN); Pei Helen Sun, Shanghai (CN); Hontao Shi, Shanghai (CN); Dake Shen, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/539,080

(22) PCT Filed: Dec. 21, 2015

(86) PCT No.: PCT/IB2015/059853
§ 371 (c)(1),
(2) Date: Jun. 22, 2017

(87) PCT Pub. No.: WO2016/103161
PCT Pub. Date: Jun. 30, 2016

(65) Prior Publication Data
US 2017/0369702 A1  Dec. 28, 2017

Related U.S. Application Data

(60) Provisional application No. 62/096,274, filed on Dec. 23, 2014.

(51) Int. Cl.
| | |
|---|---|
| *C08L 69/00* | (2006.01) |
| *C08L 83/10* | (2006.01) |
| *C08L 55/02* | (2006.01) |
| *C08K 3/013* | (2018.01) |
| *C08K 5/49* | (2006.01) |
| *C08K 3/34* | (2006.01) |
| *C08K 5/523* | (2006.01) |
| *C08L 51/04* | (2006.01) |

(52) U.S. Cl.
CPC .............. *C08L 69/00* (2013.01); *C08K 3/013* (2018.01); *C08K 3/34* (2013.01); *C08K 5/523* (2013.01); *C08L 51/04* (2013.01); *C08L 55/02* (2013.01); *C08L 83/10* (2013.01); *C08L 2201/02* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 8,158,701 B1 | 4/2012 | Gallucci et al. | |
| 2010/0160508 A1 | 6/2010 | Taschner et al. | |
| 2011/0028615 A1* | 2/2011 | Li | C08L 69/00 524/140 |
| 2011/0034597 A1* | 2/2011 | Moy | C07F 9/12 524/127 |
| 2014/0107264 A1 | 4/2014 | van der Weele et al. | |
| 2014/0200295 A1 | 7/2014 | Liu | |
| 2015/0099845 A1* | 4/2015 | Daga | C08L 69/00 524/506 |

FOREIGN PATENT DOCUMENTS

| | | |
|---|---|---|
| CN | 101161658 A | 4/2008 |
| CN | 101511850 A | 8/2009 |
| CN | 102264835 A | 11/2011 |
| CN | 102471569 A | 5/2012 |
| CN | 102888086 A | 1/2013 |
| CN | 103351588 A | 10/2013 |
| CN | 104937031 A | 9/2015 |
| KR | 2005-0032100 A | 4/2005 |
| KR | 2011-0100630 A1 | 9/2011 |
| WO | 2010072350 A1 | 7/2010 |
| WO | 2014060948 A1 | 4/2014 |
| WO | 2014113453 A1 | 7/2014 |
| WO | 2015054179 A1 | 4/2015 |

\* cited by examiner

*Primary Examiner* — Vu A Nguyen
(74) *Attorney, Agent, or Firm* — Baker Hostetler LLP

(57) ABSTRACT

The disclosure concerns blended thermoplastic compositions comprising (a) from about 50 wt % to about 80 wt % of a polycarbonate component; (b) from greater than 0 wt % to about 12 wt % of an impact modifier component; (c) from about 10 wt % to about 40 wt % of a filler; and (d) from about 5 wt % to about 15 wt % of a flame retardant component comprising an oligomeric phosphate ester, wherein the oligomeric phosphate ester is a free flowing powder at 23° C.; wherein the blended thermoplastic composition has a ductility of 100% at 10° C. when measured by a Notched Izod Impact test performed according to ASTM D256; wherein the combined weight percent value of all components does not exceed 100 wt %; and wherein all weight percent values are based on the total weight of the composition.

18 Claims, No Drawings

REINFORCED POLYCARBONATE COMPOSITIONS

CROSS-REFERENCE TO RELATED APPLICATIONS

This application is the National Stage of International Application No. PCT/IB2015/059853, filed Dec. 21, 2015, which claims the benefit of U.S. Provisional Application No. 62/096,274, filed Dec. 23, 2014, the disclosures of which are incorporated herein by reference in their entireties.

TECHNICAL FIELD

The disclosure concerns blended theromoplastic compositions, articles comprising such compositions and methods for making such compositions and articles.

BACKGROUND

Flame retardants like bisphenol A bis(diphenyl phosphate) (BPADP) and resorcinol bis(diphenyl phosphate) (RDP) are known to adversely affect the impact strength as they cause an increase in the ductile-brittle transition temperature of certain thermoplastic compositions. Therefore, it is hard to maintain good impact performance at both low temperature and room temperature when introducing conventional flame retardants. In filled product, incorporation of filler further impedes the ability to achieve good performance at both room temperature and lower temperatures. There is a need in the market for products that maintain good impact performance at both low temperature and room temperature.

SUMMARY

In some aspects, the disclosure concerns a blended thermoplastic composition comprising (a) from about 50 wt % to about 80 wt % of a polycarbonate component; (b) from greater than 0 wt % to about 12 wt % of an impact modifier component; (c) from about 10 wt % to about 40 wt % of a filler; and (d) from about 5 wt % to about 15 wt % of a flame retardant component comprising an oligomeric phosphate ester, wherein the oligomeric phosphate ester is a free flowing powder at 23° C.; wherein the combined weight percent value of all components does not exceed 100 wt %; and wherein all weight percent values are based on the total weight of the composition. In some embodiments, the blended thermoplastic composition has a ductility of 100% at 10° C. when measured by a Notched Izod Impact test performed according to ASTM D256.

In other aspects, the disclosure concerns articles comprising the blended thermoplastic compositions disclosed herein.

In yet other aspects the disclosure concerns methods of preparing a composition, comprising the step of combining (a) from about 50 wt % to about 80 wt % of a polycarbonate component; (b) from greater than 0 wt % to about 12 wt % of an impact modifier component; (c) from about 10 wt % to about 40 wt % of a filler; and (d) from about 5 wt % to about 15 wt % of a flame retardant component comprising an oligomeric phosphate ester, wherein the oligomeric phosphate ester is a free flowing powder at 23° C.; wherein the combined weight percent value of all components does not exceed 100 wt %; and wherein all weight percent values are based on the total weight of the composition. In some embodiments, the blended thermoplastic composition has a ductility of 100% at 10° C. when measured by a Notched Izod Impact test performed according to ASTM D256.

DETAILED DESCRIPTION OF ILLUSTRATIVE EMBODIMENTS

The present disclosure can be understood more readily by reference to the following detailed description of the disclosure and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Polycarbonate Polymer

The terms "polycarbonate" or "polycarbonates" as used herein includes copolycarbonates, homopolycarbonates and (co)polyester carbonates.

The term polycarbonate can be further defined as compositions have repeating structural units of the formula (1):

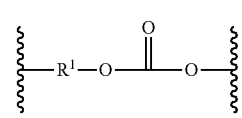

(1)

in which at least 60 percent of the total number of $R^1$ groups are aromatic organic radicals and the balance thereof are aliphatic, alicyclic, or aromatic radicals. In a further aspect, each $R^1$ is an aromatic organic radical and, more preferably, a radical of the formula (2):

$$-A^1-Y^1-A^2-  \quad (2).$$

wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene. Polycarbonate materials include materials disclosed and described in U.S. Pat. No. 7,786,246, which is hereby incorporated by reference in its entirety for the specific purpose of disclosing various polycarbonate compositions and methods for manufacture of same. Polycarbonate polymers can be manufactured by means known to those skilled in the art.

Some compositions comprise two or more polycarbonate polymers. In some embodiments, the blended thermoplastic polymer comprises from about 20 wt % to about 40 wt % of a first polycarbonate component. In some embodiments, the first polycarbonate polymer has a melt flow rate (MFR) from about 20 g/10 min to about 30 g/10 min when measured at 300° C. and under a load of 1.2 kg according to ASTM D1238. In certain embodiments, the first polycarbonate polymer has a weight average molecular weight from about 18,000 to about 25,000 g/mol, as measured by gel permeation chromatography using BPA polycarbonate standards.

For certain compositions having two or more polycarbonate polymers, the second polycarbonate polymer is present in an amount of from about 20 wt % to about 40 wt % of a second polycarbonate component. Some preferred second polycarbonate polymers have a melt flow rate (MFR) from about 4.0 g/10 min to about 10.0 g/10 min when measured at 300° C. and under a load of 1.2 kg according to ASTM D1238. Some second polycarbonate polymer components have a weight average molecular weight from about 25,000 to about 30,000 g/mol, as measured by gel permeation chromatography using BPA polycarbonate standards.

Some compositions also contain a polycarbonate-polysiloxane copolymer. In certain embodiments, this copolymer is a third polymer in the blended thermoplastic composition. In some embodiments, the polycarbonate-polysiloxane copolymer is present in an amount of 5 wt % to about 15 wt % of the blended thermoplastic composition.

As used herein, the term "polycarbonate-polysiloxane copolymer" is equivalent to polysiloxane-polycarbonate copolymer, polycarbonate-polysiloxane polymer, or polysiloxane-polycarbonate polymer. In various aspects, the polycarbonate-polysiloxane copolymer can be a block copolymer comprising one or more polycarbonate blocks and one or more polysiloxane blocks. The polysiloxane-polycarbonate copolymer comprises polydiorganosiloxane blocks comprising structural units of the general formula (3) below:

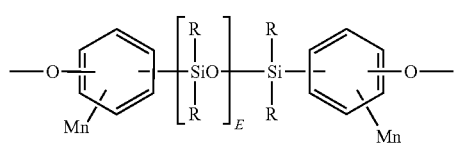

(3)

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks comprising structural units of the general formula (4) below:

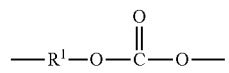

(4)

wherein at least 60 percent of the total number of $R^1$ groups comprise aromatic moieties and the balance thereof comprise aliphatic, alicyclic, or aromatic moieties. Polysiloxane-polycarbonates materials include materials disclosed and described in U.S. Pat. No. 7,786,246, which is hereby incorporated by reference in its entirety for the specific purpose of disclosing various compositions and methods for manufacture of same.

In some embodiments, the blended thermoplastic composition has a melt flow rate (MFR) of greater than or equal to about 10 g/10 min when tested in accordance with ASTM D1238 at 260° C. under a load of 2.16 kg. Certain embodiments are such that a molded sample comprising the blended thermoplastic composition has a notched Izod impact strength greater than or equal to about 500 J/m when tested in accordance with ASTM D256. Some molded samples comprising the blended thermoplastic compositions have a heat deflection temperature (HDT) greater than or equal to about 90° C. when tested in accordance with ASTM D648 on a 3.2 mm thickness bar at 1.82 MPa. In certain preferred compositions, a molded sample comprising the blended thermoplastic composition has a pFTP value greater than or equal to about 0.85.

Some blended thermoplastic composition comprise from about 60 wt % to about 80 wt % of a polycarbonate component; from about 1 wt % to about 5 wt % of an impact modifier component; from about 5 wt % to about 25 wt % of a mineral filler component; and from about 5 wt % to about 12 wt % of a flame retardant component. Other blended thermoplastic compositions comprise from about 60 wt % to about 80 wt % of a polycarbonate component; from about 1 wt % to about 4 wt % of an impact modifier component; from about 10 wt % to about 20 wt % of a mineral filler component; and from about 5 wt % to about 10 wt % of a flame retardant component. Yet other blended thermoplastic composition comprise from about 60 wt % to about 80 wt % of a polycarbonate component; from about 1 wt % to about 3 wt % of an impact modifier component; from about 12.5 wt % to about 17.5 wt % of a mineral filler component; and from about 6 wt % to about 9 wt % of a flame retardant component. Still other blended thermoplastic compositions comprise from about 20 wt % to about 40 wt % of a first polycarbonate component; wherein the first polycarbonate polymer component has a melt flow rate (MFR) from about 20 g/10 min to about 30 g/10 min when measured at 300° C. and under a load of 1.2 kg according to ASTM D1238; and wherein the first polycarbonate polymer component has a weight average molecular weight from about 18,000 to about 25,000 g/mol, as measured by gel permeation chromatography using BPA polycarbonate standards; from about 20 wt % to about 40 wt % of a second polycarbonate component; wherein the second polycarbonate polymer component has a melt flow rate (MFR) from about 4.0 g/10 min to about 10.0 g/10 min when measured at 300° C. and under a load of 1.2 kg according to ASTM D1238; and
wherein the second polycarbonate polymer component has a weight average molecular weight from about 25,000 to about 30,000 g/mol, as measured by gel permeation chromatography using BPA polycarbonate standards; from about 5 wt % to about 15 wt % of a third polycarbonate component; wherein the third polycarbonate component is a polycarbonate-polysiloxane copolymer; wherein the third polycarbonate component comprises a polysiloxane block from about 15 wt % to about 30 wt % of the polycarbonate-polysiloxane copolymer; from greater than about 0 wt % to about 5 wt % of an impact modifier component; from greater than about 0 wt % to about 25 wt % of a mineral filler component; and from about 5 wt % to about 15 wt % of a flame retardant component.

Other blended thermoplastic composition comprise (a) from about 20 wt % to about 40 wt % of a first polycarbonate component; wherein the first polycarbonate polymer component has a melt flow rate (MFR) from about 20 g/10 min to about 30 g/10 min when measured at 300° C. and under a load of 1.2 kg according to ASTM D1238; and wherein the first polycarbonate polymer component has a weight average molecular weight from about 18,000 to about 25,000 g/mol, as measured by gel permeation chromatography using BPA polycarbonate standards; (b) from about 20 wt % to about 40 wt % of a second polycarbonate component; wherein the second polycarbonate polymer component has a melt flow rate (MFR) from about 4.0 g/10 min to about 10.0 g/10 min when measured at 300° C. and under a load of 1.2 kg according to ASTM D1238; and wherein the second polycarbonate polymer component has a weight average molecular weight from about 25,000 to about 30,000 g/mol, as measured by gel permeation chromatography using BPA polycarbonate standards; (c) from about 5 wt % to about 15 wt % of a third polycarbonate component; wherein the third polycarbonate component is a polycarbonate-polysiloxane copolymer; wherein the third polycarbonate component comprises a polysiloxane block from about 15 wt % to about 30 wt % of the polycarbonate-polysiloxane copolymer; (d) from greater than about 0 wt % to about 5 wt % of an impact modifier component; (e) from greater than about 0 wt % to about 25 wt % of a mineral filler component; and (f) from about 5 wt % to about 15 wt % of a flame retardant component; wherein the combined weight percent value of all components does not exceed about 100 wt %; wherein all weight percent values are based on the total weight of the composition; wherein the blended thermoplastic composition has a melt flow rate (MFR) of greater than or equal to about 10 g/10 min when tested in accordance with ASTM D1238 at 260° C. under a load of 2.16 kg; wherein a molded sample comprising the blended thermoplastic composition has a notched Izod impact strength greater than or equal to about 500 J/m when tested in accordance with ASTM D256; wherein a molded sample comprising the blended thermoplastic composition has a heat deflection temperature (HDT) greater than or equal to about 90° C. when tested in accordance with ASTM D648 on a 3.2 mm thickness bar at 1.82 MPa; and wherein a molded sample comprising the blended thermoplastic composition has a pFTP value greater than or equal to about 0.85. In each of the preceding blended thermoplastic compositions, the combined weight percent value of all components does not exceed about 100 wt %; and wherein all weight percent values are based on the total weight of the composition.

Fillers, Reinforcing Fillers, Flame Retardants, and Surface Enhancers

In some embodiments, additives such as fillers, flame retardants, and surface enhancers can be added to the compositions disclosed herein. Exemplary fillers and flame retardants are discussed in U.S. Pat. No. 7,786,246, which is hereby incorporated by reference in its entirety for the specific purpose of disclosing various compositions.

Certain fillers are discussed in US 2014/0107266, which is incorporated herein in its entirety. Filler components include glass beads, glass fiber, glass flakes, mica, talc, clay, wollastonite, zinc sulfide, zinc oxide, carbon fiber (including standard carbon fiber, a performance carbon fiber, or a long carbon fiber), ceramic-coated graphite, titanium dioxide, or combinations thereof. Some compositions comprise a mineral filler. In some embodiments, the mineral filler component is selected from a fibrous filler, a platy filler, or combinations thereof. Preferred mineral fillers include talc, wollastonite, or combinations thereof. In some compositions, the mineral filler component is present in an amount from about 0 wt % to about 25 wt % of the blended composition. In other embodiments, the mineral filler is present in an amount of about 10 wt % to about 20 wt % of the blended composition.

Flame retardants include phosphorus-containing flame retardants. Examples include phosphazene, aryl phosphate, bisphenol A disphosphate, resorcinol bis-diphenylphosphate, bisphenol A diphenyl phosphate, or resorcinol diphosphate, or a combination thereof. Certain flame retardants are discussed in US 2014/0107266, which is incorporated herein in its entirety. Especially preferred flame retardants are oligomeric phosphate esters which are free flowing powder sat 23° C. In some embodiments, these free flowing powders can be used with a second flame retardant. Preferred second flame retardants include liquid and solid organic phosphate esters include at least one of resorcinol-bis(diphenylphosphate) and bisphenol-A diphenyl phosphate.

In some embodiments, the phosphorus-containing flame retardant comprises a first flame retardant and a second flame retardant. Options for the first flame retardant include rescorcinol bis(diphenyl phosphate), resorcinol bis(dixylenyl phosphate), hydroquinone bis(diphenyl phosphate), bisphenol-A bis(diphenyl phosphate), 4,4'-biphenol bis(diphenyl phosphate), triphenyl phosphate, methylneopentyl phosphite, pentaerythritol diethyl diphosphite, methyl neopentyl phosphonate, phenyl neopentyl phosphate, pentaerythritol diphenyldiphosphate, dicyclopentyl hypodiphosphate, dineopentyl hypophosphite, phenylpyrocatechol phosphite, ethylpyrocatechol phosphate and dipyrocatechol hypodiphosphate. Options for the second flame retardant include aromatic cyclic phosphazene compounds having a structure represented by the formula:

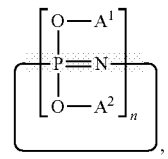

wherein each of A1 and A2 is independently an aryl group having 6 to 10 carbon atoms optionally substituted with 1 to 4 alkyl groups having 1 to 4 carbon atoms; and wherein n is an integer of 3 to 6. In certain embodiments, the first flame retardant is present in an amount from about 1 wt % to about 4 wt % of the blended composition and the second flame retardant is present in an amount from about 4 wt % to about 8 wt % of the blended composition.

Impact modifiers include acrylonitrile-butadiene-styrene (ABS) polymer component, methyl methacrylate-butadiene-styrene (MBS) polymer component, bulk polymerized ABS (BABS) polymer, polyolefin elastomer (POE) polymer component, and silicone rubber impact modifier (SAIM) polymer component, and combinations thereof. Certain impact modifiers are discussed in US20140179817 which is incorporated herein in its entirety.

Some blended compositions have an antioxidant. Some antioxidants are primary antioxidants such as hindered phenols and secondary aryl amines. Some antioxidants are secondary anti-oxidants such as organophosphate, thioesters, or combinations thereof. Blended composition can have either primary, secondary or a mixture of primary and secondary antioxidants. In some embodiments, the primary anti-oxidant is present in an amount from about 0.01 wt % to about 0.50 wt % based on the weight of the blended composition. In certain embodiments, the secondary antioxidant is present in an amount from about 0.01 wt % to about 0.50 wt % of the blended composition.

Additional components can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, chain extender, colorant (e.g, a dye or pigment), de-molding agents, flow promoter, flow modifier, surface effect additive, radiation stabilizer, flame retardant, anti-drip agent (e.g., a PTFE-encapsulated styrene-acrylonitrile copolymer (TSAN)), or a combination comprising one or more of the foregoing.

Articles of Manufacture

In one aspect, the present disclosure pertains to shaped, formed, or molded articles comprising the blended thermoplastic compositions. The blended thermoplastic compositions can be molded into useful shaped articles by a variety of means such as injection molding, extrusion, rotational molding, blow molding and thermoforming to form articles. The blended thermoplastic compositions described herein can also be made into film and sheet as well as components of laminate systems. In a further aspect, a method of manufacturing an article comprises melt blending the polycarbonate component, the impact modifier component, the flame retardant component, and the mineral filler component; and molding the extruded composition into an article. In a still further aspect, the extruding is done with a twin-screw extruder.

In a further aspect, the article is extrusion molded. In a still further aspect, the article is injection molded.

Formed articles include, for example, personal computers, notebook and portable computers, cell phone antennas and other such communications equipment, medical applications, RFID applications, automotive applications, and the like. In various further aspects, the article is a computer and business machine housing such as a housing for high end laptop personal computers, monitors, a hand held electronic device housing such as a housing for smart phones, tablets, music devices electrical connectors, and components of lighting fixtures, ornaments, home appliances, and the like.

In a further aspect, the present disclosure pertains to electrical or electronic devices comprising the disclosed blended polycarbonate compositions. In a further aspect, the electrical or electronic device comprising the disclosed blended polycarbonate compositions is a cellphone, a MP3 player, a computer, a laptop, a camera, a video recorder, an electronic tablet, a pager, a hand receiver, a video game, a calculator, a wireless car entry device, an automotive part, a filter housing, a luggage cart, an office chair, a kitchen appliance, an electrical housing, an electrical connector, a lighting fixture, a light emitting diode, an electrical part, or a telecommunications part.

In various aspects, the polymer composition can be used in the field of electronics. In a further aspect, non-limiting examples of fields which can use the disclosed blended thermoplastic polymer compositions include electrical, electro-mechanical, radio frequency (RF) technology, telecommunication, automotive, aviation, medical, sensor, military, and security. In a still further aspect, the use of the disclosed blended thermoplastic polymer compositions can also be present in overlapping fields, for example in mechatronic systems that integrate mechanical and electrical properties which may, for example, be used in automotive or medical engineering.

In a further aspect, the article is an electronic device, automotive device, telecommunication device, medical device, security device, or mechatronic device. In a still further aspect, the article is selected from a computer device, electromagnetic interference device, printed circuit, Wi-Fi device, Bluetooth device, GPS device, cellular antenna device, smart phone device, automotive device, medical device, sensor device, security device, shielding device, RF antenna device, LED device, and RFID device. In yet a further aspect, the article is selected from a computer device, sensor device, security device, RF antenna device, LED device and RFID device. In an even further aspect, the article is selected from a computer device, RF antenna device, LED device and RFID device. In a still further aspect, the article is selected from a RF antenna device, LED device and RFID device. In yet a further aspect, the article is selected from a RF antenna device and RFID device. In an even further aspect, the article is a LED device. In a still further aspect, the LED device is selected from a LED tube, a LED socket, and a LED heat sink.

In various aspects, molded articles according to the present disclosure can be used to produce a device in one or more of the foregoing fields. In a still further aspect, non-limiting examples of such devices in these fields which can use the disclosed blended thermoplastic polymer compositions according to the present disclosure include computer devices, household appliances, decoration devices, electromagnetic interference devices, printed circuits, Wi-Fi devices, Bluetooth devices, GPS devices, cellular antenna devices, smart phone devices, automotive devices, military devices, aerospace devices, medical devices, such as hearing aids, sensor devices, security devices, shielding devices, RF antenna devices, or RFID devices.

In a further aspect, the molded articles can be used to manufacture devices in the automotive field. In a still further aspect, non-limiting examples of such devices in the automotive field which can use the disclosed blended thermoplastic compositions in the vehicle's interior include adaptive cruise control, headlight sensors, windshield wiper sensors, and door/window switches. In a further aspect, non-limiting examples of devices in the automotive field which can the disclosed blended thermoplastic compositions in the vehicle's exterior include pressure and flow sensors for engine management, air conditioning, crash detection, and exterior lighting fixtures.

In a further aspect, the resulting disclosed compositions can be used to provide any desired shaped, formed, or molded articles. For example, the disclosed compositions can be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed compositions can be used to form articles such as printed circuit board carriers, burn in test sockets, flex brackets for hard disk drives, and the like.

Definitions

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

As used herein, the terms "weight average molecular weight" or "Mw" can be used interchangeably, and are defined by the formula:

$$M_w = \frac{\sum N_i M_i^2}{\sum N_i M_i},$$

where Mi is the molecular weight of a chain and Ni is the number of chains of that molecular weight. Compared to Mn, Mw takes into account the molecular weight of a given chain in determining contributions to the molecular weight average. Thus, the greater the molecular weight of a given chain, the more the chain contributes to the Mw. Mw can be determined for polymers, e.g. polycarbonate polymers, by methods well known to a person having ordinary skill in the art using molecular weight standards, e.g. polycarbonate standards or polystyrene standards, preferably certified or traceable molecular weight standards.

The terms "BisA," "BPA," or "bisphenol A," which can be used interchangeably, as used herein refers to a compound having a structure represented by the formula:

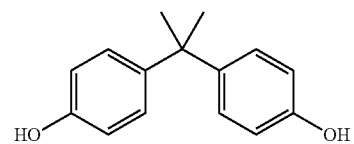 [SMILES: CC(C)(c1ccc(O)cc1)c1ccc(O)cc1]

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

As used herein, "polycarbonate" (abbreviated "PC") refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates.

"GPS" stands for global positioning system. "RF" stands for radio frequency. "LED" stands for light emitting diode. "RFID" stands for radio frequency identification.

"° C." or "C" stands for degrees centigrade.

"g" stands for gram(s). "kg" is the abbreviation for kilogram(s).

"MPa" stands for megapascal.

"J" is the abbreviation for Joule(s).

"kJ" is the abbreviation for kilojoule.

"M" stands for meter(s).

"mm" is the abbreviation for millimeter(s).

"min" is the abbreviation for minute(s).

"mol" stands for mole(s).

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Aspects

In various aspects, the present disclosure pertains to and includes at least the following aspects.

Aspect 1. A blended thermoplastic composition comprising: (a) from about 50 wt % to about 80 wt % of a polycarbonate component; (b) from greater than 0 wt % to about 12 wt % of an impact modifier component; (c) from about 10 wt % to about 40 wt % of a filler; and (d) from about 5 wt % to about 15 wt % of a flame retardant component comprising an oligomeric phosphate ester; wherein the oligomeric phosphate ester is a free flowing powder at 23° C.; wherein the combined weight percent value of all components does not exceed 100 wt %; and wherein all weight percent values are based on the total weight of the composition.

Aspect 2. The composition of Aspect 1, wherein the blended thermoplastic composition has a ductility of 100% at 10° C. when measured by a Notched Izod Impact test performed according to ASTM D256 (90% or 80% or 70% ductility in some embodiments).

Aspect 3. The composition of Aspect 1 or Aspect 2, wherein the polycarbonate component comprises at least one bisphenol A polycarbonate and at least one polycarbonate-polysiloxane copolymer.

Aspect 4. The composition of Aspect 3, wherein bisphenol A polycarbonate is a homopolymer comprising repeating units derived from bisphenol A.

Aspect 5. The composition of any one of Aspects 1-4, wherein the polycarbonate has a weight average molecular weight from about 18,000 to about 40,000 g/mol, as measured by gel permeation chromatography using BPA polycarbonate standards.

Aspect 6. The composition of any one of Aspects 1-5, wherein the polycarbonate component comprises a blend of at least two polycarbonate polymers including a first polycarbonate polymer component and a second polycarbonate polymer component.

Aspect 7. The composition of Aspect 6, wherein the first polycarbonate polymer component is a high flow polycarbonate, and wherein the second polycarbonate polymer component is a low flow polycarbonate. In some embodiments, the first polycarbonate polymer component is a high flow polycarbonate having a weight average molecular weight of from about 15,000 g/mol to about 30,000 g/mol, and the second polycarbonate polymer component is a low flow polycarbonate having a weight average molecular weight from about 20,000 to about 40,000 g/mol.

Aspect 8. The composition of Aspect 6, wherein the first polycarbonate component is present in an amount from about 20 wt % to about 70 wt %; and wherein the second polycarbonate component is present in an amount from about 5 wt % to about 40 wt % based on the total weight of the composition.

Aspect 9. The composition of Aspect 6, further comprising a third polycarbonate polymer component.

Aspect 10. The composition of Aspect 9, wherein the third polycarbonate polymer component is the polycarbonate-polysiloxane copolymer.

Aspect 11. The composition of Aspect 9, wherein the polycarbonate-polysiloxane copolymer is a block copolymer.

Aspect 12. The composition of Aspect 11, wherein the polycarbonate block comprises residues derived from BPA.

Aspect 13. The composition of Aspect 11, wherein the copolymer comprises dimethylsiloxane repeating units.

Aspect 14. The composition of Aspect 11, wherein the copolymer comprises a polysiloxane block from about 18 wt % to about 24 wt % of the polycarbonate-polysiloxane copolymer based on the total weight of the composition.

Aspect 15. The composition of Aspect 11, wherein the first polycarbonate component is present in an amount from about 20 wt % to about 70 wt %; wherein the second polycarbonate component is present in an amount from about 5 wt % to about 40 wt %; and wherein the third polycarbonate component is present in an amount from about 1 wt % to about 20 wt % based on the total weight of the composition.

Aspect 16. The composition of any one of Aspects 1-15, additionally comprising from about 1 wt % to about 10 wt %, based on the total weight of the composition, of a second flame retardant component that is a phosphate ester that is a liquid at 23° C.

Aspect 17. The composition of Aspect 16, wherein the second flame retardant component comprises at least one of resorcinol-bis(diphenylphosphate) and bisphenol-A diphenyl phosphate.

Aspect 18. The composition of any one of Aspects 1-17, wherein the filler is one or more of talc, wollastonite, glass fiber, clay and mica.

Aspect 19. The composition of any one of Aspects 1-18, wherein the composition is capable of achieving a UL 94 V0 rating at a thickness of 1.5 mm or less.

Aspect 20. The composition of any one of Aspects 1-19, wherein the composition is capable of achieving a UL94 V1 rating at a thickness of 1.2 mm or less.

Aspect 21. The composition of any one of Aspects 1-20, wherein the impact modifier component comprises at least one of acrylonitrile-butadiene-styrene (ABS) polymer methyl methacrylate-butadiene-styrene (MBS), methyl methacrylate-butadiene (MB) polymer and silicone-acrylic-based rubber.

Aspect 22. The composition of Aspect 20 wherein the impact modifier is present in an amount from about 1 wt % to about 8 wt %.

Aspect 23. The composition of any one of Aspects 1-22, additionally comprising one ore more additives selected from anti-drip agents, antioxidants, antistatic agents, chain extenders, colorants, de-molding agents, dyes, flow promoters, flow modifiers, light stabilizers, lubricants, mold release agents, pigments, quenching agents, thermal stabilizers, UV absorbent substances, UV reflectant substances, and UV stabilizers.

Aspect 24. An article comprising the composition of any one of Aspects 1-23.

Aspect 25. The article of Aspect 24, wherein the article is molded.

Aspect 26. A method of preparing a composition, comprising the step of combining: (a) from about 50 wt % to about 80 wt % of a polycarbonate component; (b) from greater than 0 wt % to about 12 wt % of an impact modifier component; (c) from about 10 wt % to about 40 wt % of a filler; and (d) from about 5 wt % to about 15 wt % of a flame retardant component comprising an oligomeric phosphate ester, wherein the oligomeric phosphate ester is a free flowing powder at 23° C.; wherein the combined weight percent value of all components does not exceed 100 wt %; wherein the combined weight percent value of all components does not exceed 100 wt %; and wherein all weight percent values are based on the total weight of the composition.

Aspect 27. The method of Aspect 26, wherein the blended thermoplastic composition has a ductility of 100% at 10° C. when measured by a Notched Izod Impact test performed according to ASTM D256 (90% or 80% or 70% ductility in some embodiments).

Aspect 28. The method of Aspect 26 or Aspect 27, wherein the polycarbonate component comprises at least one bisphenol A polycarbonate and at least one polycarbonate-polysiloxane copolymer.

Aspect 29. The method of, wherein said combining further comprises from about 1 wt % to about 10 wt % of a second flame retardant component that is a phosphate ester that is a liquid at 23° C.

Aspect 30. The method of any one of Aspects 26-29, wherein the combining comprises extrusion blending.

Aspect 31. The method of any one of Aspects 26-30, further comprising molding the composition into a molded article.

EXAMPLES

The disclosure is illustrated by the following non-limiting examples.

Tests were all conducted in accordance with ASTM, ISO or SABIC standards, referenced in each test below in Table 1.

TABLE 1

| Test Methods | |
|---|---|
| Melt Flow Rate, 260° C., 2.16 Kg | ASTM D 1238 |
| Melt Viscosity, 270 C., 1500 s$^{-1}$ | ISO 11443 |
| IZOD ASTM, 23° C. | ASTM D 256 |
| Tensile testing, 5 mm/min | ASTM D638 |
| Flexural testing, 1.27 mm/min | ASTM D790 |
| HDT testing, 1.82 MPa | ASTM D 648 |
| MAI testing, 2323° C. | ASTM D3763 |

All samples were prepared by melt extrusion on a Toshiba Twin Screw Extruder, using a nominal melt temperature of 260° C. and 400 rpm. Polycarbonate (PC), impact modifier and inorganic filler are premixed with Sol-DP and other additives and then the mixture is compounded through twin screw. BPADP or RDP was fed separately in middle zone.

Flammability tests were performed following the procedure of Underwriter's Laboratory Bulletin 94 entitled "Tests for Flammability of Plastic Materials, UL94", which is incorporated herein by reference. According to this procedure, the materials were classified as either UL94 V0, UL94 V1, or UL94 V2 on the basis of the test results obtained for five samples. The procedure and criteria for each of these flammability classifications according to UL94 are, briefly, as follows. Multiple specimens (20) are tested per thickness. Some specimens are tested after conditioning for 48 hours at 23° C., 50% relative humidity. The other specimens are tested after conditioning for 168 hours at 70° C. The bar is mounted with the long axis vertical for flammability testing.

The specimen is supported such that its lower end is 9.5 mm above the Bunsen burner tube. A blue 19 mm high flame is applied to the center of the lower edge of the specimen for 10 seconds. The time until the flaming of the bar ceases is recorded (T1). If burning ceases, the flame is re-applied for an additional 10 seconds. Again, the time until the flaming of the bar ceases is recorded (T2). If the specimen drips particles, these shall be allowed to fall onto a layer of untreated surgical cotton placed 305 mm below the specimen.

V0: In a sample placed so that its long axis is 180 degrees to the flame, the maximum period of flaming and/or smoldering after removing the igniting flame does not exceed 10 seconds and none of the vertically placed samples produces drips of burning particles that ignite absorbent cotton, and no specimen burns up to the holding clamp after flame or after glow.

In the examples below, the following definitions are used.

"HFD" is a high flow ductile (HFD) polycarbonate.

"PCP" is polycarbonate polymer.

"20% PC-ST" is PC-Siloxane copolymer with 20% siloxane segments by weight

"PETS" is pentaerythritol tetrastearate.

Arkon™ P-125 is a fully hydrogenated low molecular weight hydrocarbon resin made from C5-C9 petroleum feedstock.

METABLEN™ S-2001 is a core-shell impact modifier-having a silicone elastomer core and a MMA copolymer shell.

"MMA" stands for methyl methacrylate.

Table 2 shows PC/IM formulation containing BPADP, RDP or Sol-DP. Sol-DP replaced BPADP or RDP by keeping the same P content. Filler type is talc and impact modifier type is S-2001 and BABS combination. All the samples passed V0@1.5 mm test. Samples containing Sol-DP (DOE3) exhibited 100% ductility at 10C notched Izod impact test, whereas samples containing BPADP (DOE1) and RDP (DOE2) showed totally brittle failure type.

Unnotched Izod impact test at −30° C. showed the similar trend. Sample containing Sol-DP (DOE3) exhibited 20% ductility, whereas samples containing BPADP and RDP are totally brittle failure type. The results show that Sol-DP showed higher impact retention than BPADP and RDP.

Table 3 shows another example of PC/IM formulations containing BPADP, RDP or Sol-DP. Sol-DP replaced BPADP or RDP by keeping the same P content. Here filler type was changed from talc to talc/wollastonite combination. All the samples passed V0@1.5 mm test. Sample containing Sol-DP (DOE3) exhibited 100% ductility at 0° C. notched Izod impact test, whereas sample containing BPADP is totally brittle failure type, sample containing RDP is only 40% ductility failure type.

Unnotched Izod impact test at 0° C. showed the similar trend. Sample containing Sol-DP (DOE3) exhibited 60% ductility, whereas samples containing BPADP and RDP are totally brittle failure type.

The effect was also proved by Instrumented impact (MAI) at 23° C. Sample containing Sol-DP (DOE3) exhibited 100% ductility, whereas samples containing BPADP and RDP are only 80% ductility failure type. The results show that Sol-DP showed higher impact retention than BPADP and RDP.

TABLE 2

PC/IM blends formulation with BPADP, RDP or Sol-DP and their properties

| | Description | DOE1 Improved C7230P control w/BPADP | DOE2 control w/ RDP | DOE3 Sol-DP same P content as BPADP |
|---|---|---|---|---|
| | Desc. | | | |
| | 100 GRADE PCP | 28.99 | 29.79 | 29.79 |
| | PCP 1300 | 29 | 29.7 | 29.7 |
| | 20% PC/SILOXANE COPOLYMER, PCP ENDCAPPED | 5 | 5 | 5 |
| | METABLEN S-2001 | 1.5 | 1.5 | 1.5 |
| | SAN encapsulated PTFE-intermediate resin | 0.25 | 0.25 | 0.25 |
| | PENTAERYTHRITOL TETRASTEARATE | 0.5 | 0.5 | 0.5 |
| | HINDERED PHENOL ANTI-OXIDANT | 0.08 | 0.08 | 0.08 |
| | PHOSPHITE STABILIZER | 0.08 | 0.08 | 0.08 |
| | Surface modified talc (proprietory surface modifier) | 15 | 15 | 15 |
| | Bulk ABS Building Block C29449 | 7.5 | 7.5 | 7.5 |
| | SOL-DP from ICL-IP | | | 10.6 |
| | BPA-DP low acid | 12.1 | | |
| | RDP FLAME RETARDANT | | 10.6 | |
| Sum | | 100 | 100 | 100 |
| Typical Properties | Unit | | | |
| MFR(260 C./2.16 kg/300 s) | g/10 min | 14.2 | 14.3 | 12.6 |
| MV at 1500 s$^{-1}$/260 C. | Pa · s | 178.3 | 182.6 | 203.3 |
| HDT(1.82 MPa, 6.4 mm) | C | 88 | 84.7 | 87.9 |
| NII, 23 C., ASTM D256 | J/M | 97.1 | 116 | 221 |
| Ductility | % | 100 | 100 | 100 |
| NII, 10 C., ASTM D256 | J/M | 74.2 | 86 | 96.5 |
| Ductility | % | 0 | 0 | 100 |
| NII, 0 C., ASTM D256 | J/M | 78.2 | 86.7 | 101 |
| Ductility | % | 0 | 0 | 0 |
| Unotched Izod, 23 C., ASTM D256 | J/M | 2050 | 2140 | 2140 |
| Ductility | % | 100 | 100 | 100 |
| Unotched Izod, 0 C., ASTM D256 | J/M | 1600 | 1740 | 2130 |
| Ductility | % | 100 | 100 | 100 |
| Unotched Izod, −30 C., ASTM D256 | J/M | 1090 | 1080 | 1280 |
| Ductility | % | 0 | 0 | 20 |
| MAI | J | 52.7 | 54.7 | 53.8 |
| Ductility | % | 100 | 100 | 100 |
| Flex. Modulus | MPa | 4040 | 3890 | 3970 |
| Flex. Stress yld | Mpa | 94.9 | 93.7 | 91.5 |
| Tens. Stress yld | Mpa | 54.2 | 52.9 | 52 |
| Elongation at brk | % | 78 | 104 | 103 |
| UL-94 Vx @ 1.5 mm | FOT2(s) | 5.02 | 2.76 | 4.95 |
| | Pftp | 0.6085 | 0.9842 | 0.6685 |
| | drip | 0 | 0 | 0 |
| | Vx rating | V0 | V0 | V0 |

TABLE 3

PC/IM blends formulation with BPADP, RDP or Sol-DP and their properties.

| | Description | DOE1 CM6220 control w/BPADP | DOE2 control w/ RDP | DOE3 Sol-DP same P content as BPADP |
|---|---|---|---|---|
| Desc. | | | | |
| | 100 GRADE PCP | 32.628 | 33.278 | 33.278 |
| | PCP 1300 | 22.612 | 23.262 | 23.262 |
| | EXL | 3 | 3 | 3 |
| | METABLEN S-2001 | 2.5 | 2.5 | 2.5 |
| | TSAN | 0.5 | 0.5 | 0.5 |
| | PETS | 0.2 | 0.2 | 0.2 |
| | HINDERED PHENOL ANTI-OXIDANT | 0.08 | 0.08 | 0.08 |
| | PHOSPHITE STABILIZER | 0.08 | 0.08 | 0.08 |
| | Surface modified talc | 10 | 10 | 10 |
| | wollastonite 4W 10992 | 15 | 15 | 15 |
| | Arkon P-125 | 3 | 3 | 3 |
| | SOL-DP from ICL-IP | | | 9.1 |
| | BPA-DP low acid | 10.4 | | |
| | RDP | | 9.1 | |
| Sum | | 100 | 100 | 100 |
| Typical Properties | Unit | | | |
| MFR(260 C./2.16 kg/300 s) | g/10 min | 11.6 | 10.8 | 10.5 |
| MFR(260 C./2.16 kg/1080 s) | g/10 min | 11 | 9.88 | 9.17 |
| MV at 1500 s$^{-1}$/260 C. | Pa·s | 200.9 | 210.1 | 220.6 |
| HDT(1.82 MPa, 6.4 mm) | C | 86.1 | 82.9 | 87 |
| NII, 23 C., ASTM D256 | J/M | 105 | 117 | 151 |
| Ductility | % | 100 | 100 | 100 |
| NII, 0 C., ASTM D256 | J/M | 58.3 | 63.3 | 78 |
| Ductility | % | 0 | 40 | 100 |
| Unotched Izod, 23 C., ASTM D256 | J/M | 1260 | 1230 | 1540 |
| Ductility | % | 100 | 100 | 100 |
| Unotched Izod, 0 C., ASTM D256 | J/M | 785 | 763 | 827 |
| Ductility | % | 0 | 0 | 60 |
| MAI | J | 38.1 | 33.7 | 39.3 |
| Ductility | % | 80 | 80 | 100 |
| Flex. Modulus | MPa | 5810 | 5850 | 5870 |
| Flex. Stress yld | Mpa | 95.5 | 95.8 | 94.4 |
| Tens. Stress yld | Mpa | 52.6 | 52.2 | 51.4 |
| Elongation at brk | % | 11 | 17 | 18 |
| UL-94 Vx @ 1.5 mm | FOT2(s) | 5.05 | 3.21 | 3.32 |
| | Pftp | 0.7671 | 1 | 1 |
| | drip | 0 | 0 | 0 |
| | Vx rating | V0 | V0 | V0 |

Table 4 shows the PC/IM formulation containing BPADP, Sol-DP, or their combination. Sol-DP replaced BPADP by keeping the same P content. Here filler type is talc, wollastonite and glass fiber combination, and PC combined PCR PC, virgin PC and HFD type PC.

Even all the samples exhibited totally brittle failure type in NII test, we still observed NII value was increased from 58 for sample containing BPADP (DOE1), to 67 for sample containing BPADP and Sol-DP combination (DOES), and 72 J/m for sample containing only Sol-DP (DOE2).

FR performance was improved significantly. Sample containing BPADP only can get V1@1.2 mm rating, whereas sample containing Sol-DP, or BPADP and Sol-DP combination passed V0@1.2 mm test.

TABLE 4

PC/IM blends formulation with BPADP, or Sol-DP, or BPADP and Sol-DP combination, and their properties.

| Formulation | Description | Unit | DOE1 | DOE2 | DOE3 |
|---|---|---|---|---|---|
| C023A | 100 Grade PCP | % | 12.24 | 13.64 | 13.64 |
| F8210 | Metablen S-2001 | % | 2.5 | 2.5 | 2.5 |
| C914089 | High flow HFD | % | 10 | 10 | 10 |
| C9030P | 20% PC-ST | % | 3 | 3 | 3 |
| Akron125 | Akron P-125 | % | 3 | 3 | 3 |
| F406243 | Fyrolflex™ Sol-DP | % | | 9 | 6 |
| CR741 | BPADP | % | 10.4 | | |
| F503674 | Talc | % | 10 | 10 | 10 |
| F533718 | Wollastonite | % | 15 | 15 | 15 |
| 5103-B | Glass fiber | % | 3 | 3 | 3 |
| D9101A | PC from CD | % | 15 | 15 | 15 |
| D9102A | PC from WB | % | 15 | 15 | 15 |

TABLE 4-continued

PC/IM blends formulation with BPADP, or Sol-DP, or BPADP and Sol-DP combination, and their properties.

| Formulation | Description | Unit | DOE1 | DOE2 | DOE3 |
|---|---|---|---|---|---|
| F449 | TSAN | % | 0.5 | 0.5 | 0.5 |
| F538 | PETS | % | 0.2 | 0.2 | 0.2 |
| F527 | Anti-Oxidant | % | 0.08 | 0.08 | 0.08 |
| F542 | Stabilizer | % | 0.08 | 0.08 | 0.08 |
| R203 | Carbon Black | % | 0.5 | 0.5 | 0.5 |
| Sum | | % | 100.5 | 100.5 | 100.5 |

| Typical Propertie | Test Condition | Unit | | | |
|---|---|---|---|---|---|
| Flow | | | | | |
| MFR (260 C./ 2.16 kg/ 300 s) | g/10 min | g/10 min | 13.5 | 9.2 | 11.4 |
| Impact | | | | | |
| Notched Izod Impact | ASTM D256, 23 C. | J/M | 58 | 72 | 67 |
| Ductility | | % | 0 | 0 | 0 |
| Modulus | | | | | |
| Flex. Modulus | 1.3 mm/min | MPa | 6910 | 6950 | 6810 |
| Flex. Stress yld | 1.3 mm/min | MPa | 104 | 101 | 101 |
| Tens. Stress yld | 5 mm/min | MP | 60 | 57 | 58 |
| Elongation to Break | 5 mm/min | % | 2 | 2 | 2 |
| FR | | | | | |
| UL-94 VX @ 1.2 mm | FOT2 | s | 7.9 | 3.8 | 3.1 |
| | Drip | | 0 | 0 | 0 |
| | Vx Rating | | V1 | V0 | V0 |

TABLE 5

PC/IM blends formulation with Sol-DP and Sol-DP/BPADP combination, and their properties.

| Formulation | Description | Unit | DOE1 | DOE2 | DOE3 |
|---|---|---|---|---|---|
| C017 | PCP 1300 | % | 30.29 | 28.99 | 23.99 |
| C023A | 100 GRADE PCP | % | 35.5 | 33.8 | 28.8 |
| C9030P | 20% PC-ST copolymer | % | 10 | 10 | 10 |
| F6843 | MBS | % | 2 | 2 | 2 |
| F533718 | Wollastonite 4W 10992 | % | 15 | 15 | 25 |
| F449 | SAN encapsulated PTFE | % | 0.5 | 0.5 | 0.5 |
| F538 | PENTA-ERYTHRITOL TETRA-STEARATE | % | 0.5 | 0.5 | 0.5 |
| F527 | HINDERED PHENOL ANTI-OXIDANT | % | 0.08 | 0.08 | 0.08 |
| F542 | PHOSPHITE STABILIZER | % | 0.08 | 0.08 | 0.08 |
| F114 | SEENOX 412S | % | 0.05 | 0.05 | 0.05 |
| F406243 | SOLDP | % | 6 | 6 | 6 |
| CR741S | BPA-DP low acid | % | 3 | 3 | |
| Properties | | | | | |
| MFR, 260° C., 2.16 Kg | | g/10 min | 8.2 | 11.2 | 10.2 |
| App. Viscosity, 270° C., 1500 s−1 | | Pa · s | 258 | 225 | 202 |
| Flexural Modulus | | MPa | 3990 | 4350 | 5250 |

TABLE 5-continued

PC/IM blends formulation with Sol-DP and Sol-DP/BPADP combination, and their properties.

| Formulation | Description | Unit | DOE1 | DOE2 | DOE3 |
|---|---|---|---|---|---|
| | Flexural Stress@Yield | MPa | 93 | 94 | 95 |
| | HDT, 1.82 MPa, 3.2 mm | ° C. | 95 | 88 | 84 |
| | Notched Impact Strength, 23° C. | J/m | 671 | 315 | 214 |
| | Ductility | % | 100 | 100 | 100 |
| | Modulus of Elasticity | MPa | 3722 | 3880 | 4388 |
| | Stress at Yield | MPa | 52 | 54 | 52 |
| | Stress at Break | MPa | 49 | 46 | 40 |
| | Elongation at Yield | % | 4 | 4 | 3 |
| | Elongation at Break | % | 79 | 60 | 10 |
| | MAI Energy, Total, 23° C. | J | 49 | 49 | 32 |
| | Ductility | % | 100 | 100 | 80 |
| | VX@1.0 mm | — | V1 | V1 | V1 |

Table 5 shows that the combination of SOL-DP with BPADP could provide pretty good balance of flow, modulus, impact and FR performance for filled PC blends. For instance, the testing results of DOE 2 indicate that with 15% wollastonite reinforcement, flexural modulus could get beyond 4000 MPa together with NII>300 J/m, 100% ductility and V1@1.0 mm. With further increase of wollastontie loading in DOE 3, flexural modulus could get beyond 5000 MPa together with NII>200 J/m, 100% ductility and V1@1.0 mm, which is very impressive for thin wall FR HMD applications.

What is claimed:

1. A blended thermoplastic composition comprising:
   a) from about 50 wt % to about 80 wt % of a polycarbonate component;
   b) from greater than 0 wt % to about 12 wt % of an impact modifier component;
   c) from about 10 wt % to about 40 wt % of a filler;
   d) from about 5 wt % to about 15 wt % of a flame retardant component comprising an oligomeric phosphate ester, wherein the oligomeric phosphate ester is a free flowing powder at 23° C.; and
   e) from about 1 wt % to about 10 wt % of a second flame retardant component that is a phosphate ester that is a liquid at 23° C.,
   wherein the combined weight percent value of all components does not exceed 100 wt %, and
   wherein all weight percent values are based on the total weight of the composition.

2. The composition of claim 1, wherein the blended thermoplastic composition has a ductility of 100% at 10° C. when measured by a Notched Izod Impact test performed according to ASTM D256.

3. The composition of claim 1, wherein the polycarbonate component comprises at least one bisphenol A polycarbonate and at least one polycarbonate-polysiloxane copolymer.

4. The composition of claim 1, wherein the polycarbonate component comprises a polycarbonate having a weight average molecular weight from about 18,000 to about 40,000 grams/mole, as measured by gel permeation chromatography using BPA polycarbonate standards.

5. The composition of claim 1, wherein the polycarbonate component comprises a blend of at least two polycarbonate polymers including a first polycarbonate polymer component and a second polycarbonate polymer component.

6. The composition of claim 5, wherein the first polycarbonate polymer component is a polycarbonate having a melt flow rate (MFR) from about 20 g/10 min to about 30 g/10 min when measured at 300° C. and under a load of 1.2 kg according to ASTM D1238, and wherein the second polycarbonate polymer component is a polycarbonate having a MFR from about 4.0 g/10 min to about 10.0 g/10 min when measured at 300° C. and under a load of 1.2 kg according to ASTM D1238.

7. The composition of claim 5, wherein the first polycarbonate component is present in an amount from about 20 wt % to about 70 wt %; and wherein the second polycarbonate component is present in an amount from about 5 wt % to about 40 wt % based on the total weight of the composition.

8. The composition of claim 5, further comprising a third polycarbonate polymer component.

9. The composition of claim 8, wherein the third polycarbonate polymer component is a polycarbonate-polysiloxane copolymer.

10. The composition of claim 1, wherein the composition is capable of achieving a UL 94 V0 rating at a thickness of 1.5 mm or less.

11. The composition of claim 1, wherein the impact modifier component comprises at least one of acrylonitrile-butadiene-styrene (ABS), polymer methyl methacrylate-butadiene-styrene (MBS), methyl methacrylate-butadiene (MB) polymer, and silicone-acrylic-based rubber.

12. The composition of claim 11, wherein the impact modifier is present in an amount from about 1 wt % to about 8 wt %.

13. An article comprising the composition of claim 1.

14. A method of preparing a composition, comprising the step of combining:

a) from about 50 wt % to about 80 wt % of a polycarbonate component;
b) from greater than 0 wt % to about 12 wt % of an impact modifier component;
c) from about 10 wt % to about 40 wt % of a filler;
d) from about 5 wt % to about 15 wt % of a flame retardant component comprising an oligomeric phosphate ester, wherein the oligomeric phosphate ester is a free flowing powder at 23° C.; and
e) from about 1 wt % to about 10 wt % of a second flame retardant component that is a phosphate ester that is a liquid at 23° C., wherein the combined weight percent value of all components does not exceed 100 wt %; and wherein all weight percent values are based on the total weight of the composition.

15. The method of claim 14, wherein the composition has a ductility of 100% at 10° C. when measured by a Notched Izod Impact test performed according to ASTM D256.

16. The method of claim 14, wherein the polycarbonate component comprises at least one bisphenol A polycarbonate and at least one polycarbonate-polysiloxane copolymer.

17. The method of claim 14, wherein the combining comprises extrusion blending.

18. The method of claim 14, further comprising molding the composition into a molded article.

* * * * *